United States Patent Office 3,455,352
Patented July 15, 1969

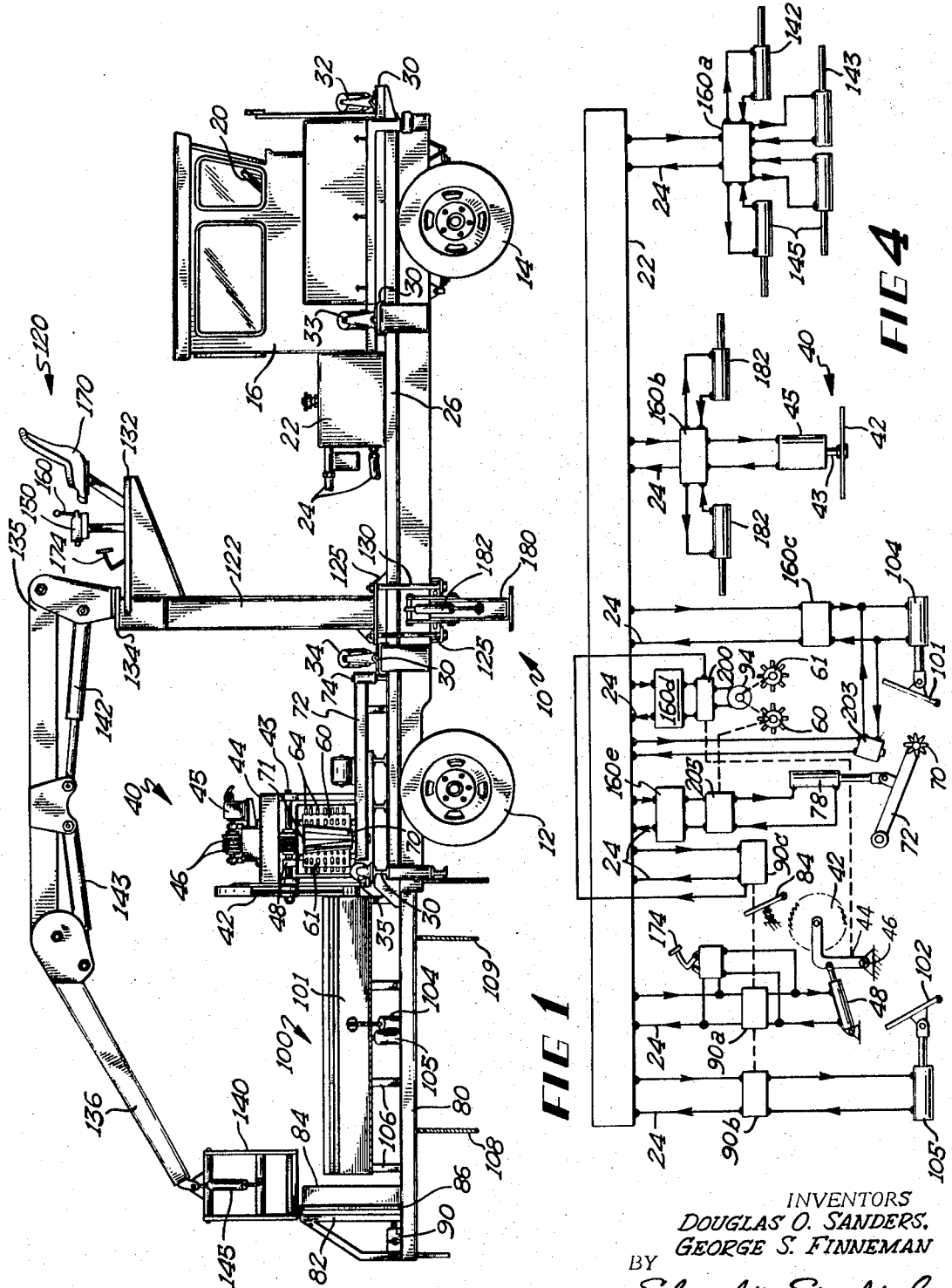

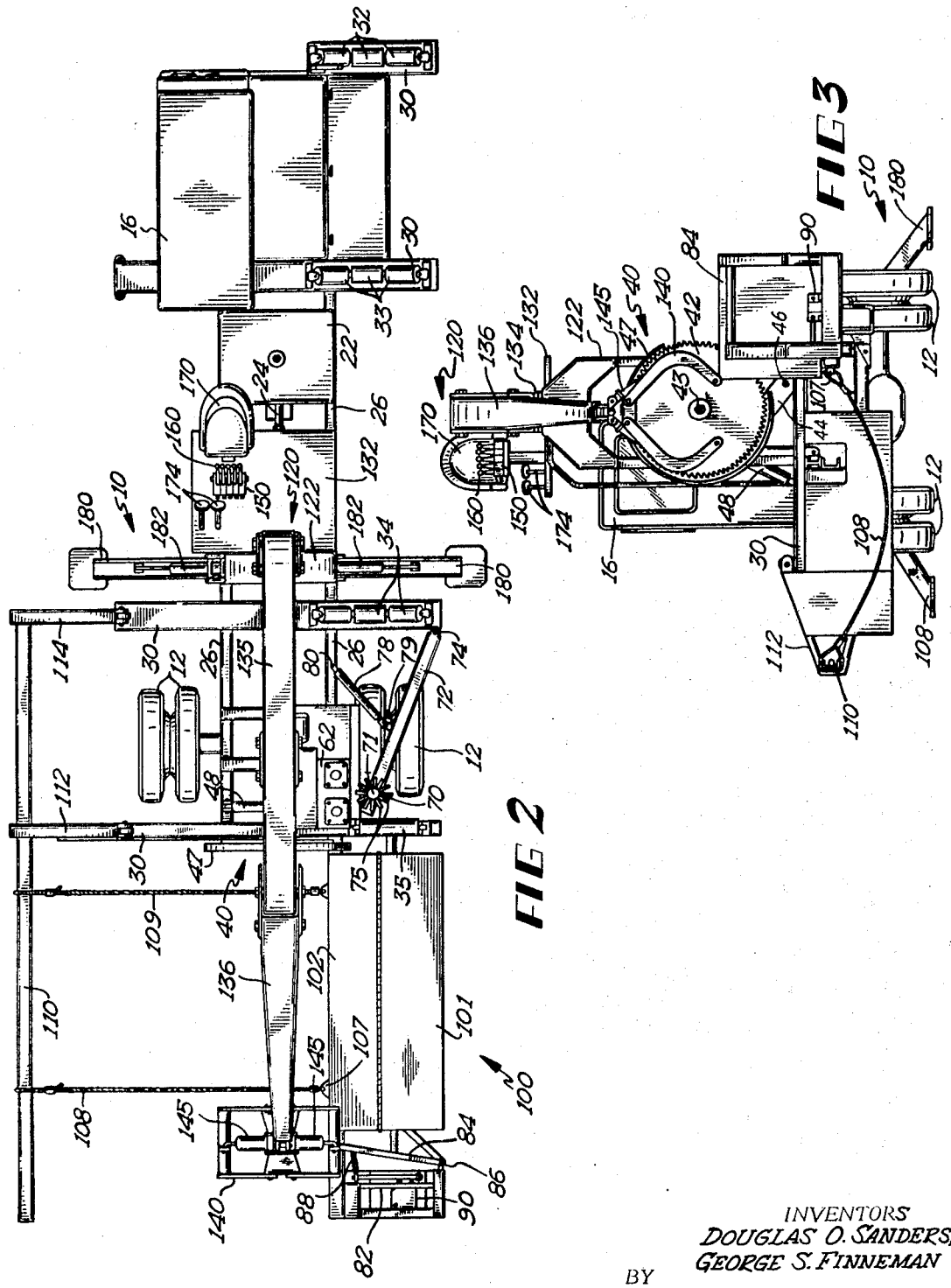

3,455,352
MOBILE LOG SLASHER
Douglas O. Sanders and George S. Finneman, Duluth, Minn., assignors to National Iron Company, Duluth, Minn., a corporation of Delaware
Filed Nov. 7, 1966, Ser. No. 592,542
Int. Cl. B27b 5/00
U.S. Cl. 143—46                                    10 Claims

ABSTRACT OF THE DISCLOSURE

A mobile log slasher for handling, feeding and cutting tree length logs into predetermined lengths and stacking the same. The apparatus includes a mobile frame with a trough-like conveying bed comprised of spaced rollers and including fixed feed rollers with a press roller to urge the log against the feed roller and move it on the conveying bed. A pivoted saw frame and saw severs the logs beyond the conveying bed and an appropriate stop control spaced from the saw is actuated by the presence of a log to operate an ejecting apparatus after the log is severed with the stop control operating the conveying feed rollers and the saw, selectively.

---

This invention relates to tree harvesting apparatus and more particularly to an improved mobile tree slasher for handling, feeding, and cutting tree length logs.

Apparatus of this general type is increasing in importance from an economic standpoint with the changes in techniques in wood and tree harvesting operations. Prior machines of this general nature have been developed for the purpose of reducing multiple and manual handling of tree length logs and severed logs in the cutting and stacking or loading operations found in present day tree harvesting. Generally, slashing equipment will be of the high capacity type in which such machines are relatively fixed in location and require special equipment to position tree length logs thereon and to remove the severed logs therefrom for stacking or loading purposes. Smaller capacity machines have been designed with a relatively low rate of production for smaller diameter wood sizes or tree trunks with little ability to dispose of the cut or severed logs. The smaller units, while mobile, require numerous independent and manual operations with the resultant lack of economic gain in their usage.

The present invention is to provide an improved mobile tree slasher or tree harvester which is highly mobile, self-contained and capable of operation by a single operator. This improved tree slasher may take tree length logs of varying lengths and diameters and position and feed the same to a slashing or sawing equipment. It includes an automatic arrangement for severing or cutting the tree length log into predetermined log lengths, automatically ejecting the same and provides derrick type loader equipment capable of operation by the machine operator to dispose of the severed logs either in stacks or loaded onto vehicles for transportation to a point of usage. This improved mobile tree slasher is incorporated into a mobile frame of a truck chassis with provisions thereon for supporting and guiding tree length logs through a feeding mechanism to the sawing site. The feeding mechanism operates in conjunction with a stop mechanism on the mobile frame which controls the saw position and feed operation so that tree length logs may be cut to exact size, collected on a receiving trough and ejected in such a manner so as to select proper length harvested logs for mechanical piling and usage while separating out short logs from those severed. In this improved mobile tree slasher, an operator through suitable control may override the automatic control and may utilize a loader derrick for loading the frame with tree length logs for continuous operation and disposing of the severed logs during the automatic sawing operation.

Therefore it is the principal object of this invention to provide an improved mobile log slasher.

Another object of this invention is to provide an improved mobile log slasher which is compact in construction and easy to operate and maintain in addition to being highly mobile so that it may be readily moved to logging sites and self-propelled for positioning in various logging locations.

A further object of this invention is to provide an improved mobile log slasher which includes a positive feed and hold mechanism to insure an accurate sawing operation and to prevent damage to the saw thereof.

A still further object of this invention is to provide in an improved mobile log slasher a control apparatus which permits automatic operation of the feeding mechanism and the saw with automatic selection of proper length logs.

A still further object of this invention is to provide an improved mobile log slasher with a loading derrick located for operation by a single operator to load the log slasher with varying diameter tree length logs from various positions about the slasher and to unload the severed logs to remote loading sites.

These and other objects of this invention will become apparent from a reading of the attached description together with the drawings wherein:

FIGURE 1 is a side elevation view of the improved mobile log slasher,

FIGURE 2 is a plan view of the improved mobile log slasher,

FIGURE 3 is a rear elevation view of the improved mobile log slasher, and

FIGURE 4 is a schematic control diagram of the improved mobile log slasher.

Our improved mobile log slasher is shown in the drawings as being incorporated on and as a part of an elongated truck chassis, indicated generally at 10, having conventional drive wheels 12 and steering and drive wheels 14 with a cab 16 and suitable controls 20 therein. A single engine or power plant (not shown) for the truck chassis is coupled to and drives a hydraulic pressure system indicated by the supply tank 22 with inlet and outlet conduits 24 therefor. The power system includes a pump (not shown) which is driven from the engine power supply of the truck to operate the equipment of the slasher as will be hereinafter described. The truck chassis indicated at 26 provides the frame for the slasher, which through operation of the vehicle in a conventional manner, will permit positioning of the slasher at varying logging sites and transportation to and from the same. This frame through a plurality of cross frame connections, indicated generally at 30, and extending to one side of the chassis mounts a plurality of sets of roller members indicated generally at 32, 33, 34 and 35 respectively to define a conveyor bed for the slasher. As indicated in the drawings, the roller members or groups 32, 33 and 34 are similar in construction and are each comprised of three different roller members journalled on suitable supports with the outboard roller members in each set being positioned at an angle to the center roller member to define a trough-like construction for the purpose of guiding tree length logs thereon. The roller member 35 is an enlarged horizontal member which is positioned, as will be hereinafter noted, adjacent the saw or severing means of the slasher. This roller member is located substantially adjacent the end of the vehicle frame.

This end of the frame mounts the saw structure, indicated generally at 40, which is comprised of a circular saw blade 42 mounted on a drive shaft 43 which is in turn positioned in a generally C-shaped frame structure 44, this frame structure mounting also a rotary hydraulic motor 45 and suitable pulleys and belting 46 to connect the motor to the drive shaft 43 for rotating the saw blade 42. A suitable guard 47 is positioned over the upper or inactive area of the saw blade in a conventional manner. The frame structure 44 is supported on the chassis of the vehicle of frame 26 through a suitable pivot structure, indicated at 46 in FIGURES 3 and 4, with a conventional hydraulic actuator 48 being connected the chassis and frame structure 44 for the purpose of tilting the support structure and hence the saw blade toward and away from the conveyor bed defined by the rollers 32–35 respectively. Under normal operation of the slasher, this rotary saw blade will be driven continuously and tilted with the support structure toward and away from the conveyor bed for successive slashing or severing operations of tree length logs in an automatic manner or under manual control of an operator, as will be hereinafter defined. Positioned adjacent the saw support structure 44 and in such a position as to clear the support frame and saw in the tilted forward or sawing position are a pair of feed rollers 60, 61. Rollers 60, 61 are mounted in an upstanding housing and support structure 62 with vertical drive axes, the feed rollers 60, 61 having a plurality of radially extending prongs or fingers 64 projecting therefrom. The rollers 60, 61 rotate in the same direction simultaneously for the purpose of engaging a surface of a tree length log, as will be hereinafter identified, and urge it along the conveyor bed in a feeding operation. The feed rollers are connected to and driven by suitable rotary hydraulic motive means (not shown) which is controlled by valving such that they may be stopped and started and rotated in opposite directions of rotation for purposes to be later noted.

Cooperating with the feed rollers 60, 61 is a freely rotating pressure roller 70. Pressure roller 70 is mounted at the extremity of an arm 72 through a vertical support axis 71 with the arm 72 being pivoted on the frame extension 30, as at 74. The pressure roller has fluted surfaces 75 or radially extending ridges which are wider at the top remote from the arm than at the bottom to provide an overall configuration similar to a truncated cone. With tree length logs positioned on the roller members 32, 33, 34 and 35, the arm 72 with the roller 70 thereon will be pivoted toward the feed rollers to hold the tree length log inbetween. Movement of the arm relative to the feed rollers is controlled by a hydraulic actuator 78 attached at one extremity, as at 79, to the arm and at the opposite extremity, as at 80, to the chassis or frame 26. The pressure roller is freely rotating and is not driven. It is adapted to urge the surface of a tree length log against the prong surfaces of the feed rollers 60, 61. The latter provides a general cylindrical configuration and the inwardly tapered fluted surfaces 75 of the pressure roller will urge the log against the conveyor bed or rollers defining the same insuring that the tree length log will be moved in the direction of movement of the feed rollers. Thus the pressure roller 70 urges a surface of a log to be conveyed on the conveyor bed against the prong surfaces of the feed rollers 60, 61 so that the prongs will engage the surface of the log adjacent the feed rollers and urge the same in the direction of movement of the rollers to move a log along the conveyor bed. As will be hereinafter noted, actuator 78 is adapted to apply one level of bias for feeding of logs and a second level of bias to clamp logs whenever the feed rollers are de-energized and it is desired to hold the log rigidly during a sawing operation.

Beyond the saw support structure 40 on the end of the chassis is an additional frame portion 80 secured thereto. The frame portion 80 includes an upstanding flange support structure 82 upon which is mounted a pressure actuated stop plate 84 at the end of the frame structure 80 and aligned with the conveyor bed defined by the rollers 32–35 respectively. The stop pressure plate is pivoted on the upstanding frame 82, as at 86, and is biased forward a predetermined distance through a spring 88. Also mounted on the upstanding frame is a plural valve structure 90 which is operated to perform a switching or sequencing operation, as will be hereinafter defined, whenever the stop or pressure plate is moved against the pressure of the bias of the spring 88 to a predetermined pivoted position. The stop or pressure plate is adapted to be engaged by tree length logs moved along the conveyor bed under the influence of the feed rollers 60, 61 and pressure roller 70 until the plate 84, which acts as a stop control means, is engaged and the spring thereon compressed operating the control valving 90 behind the same. This valving operation is interconnected with the drive motor (shown schematically at 94 in FIGURE 4) for the feed rollers 60, 61 to stop movement of the same. A suitable control valve therein will also cause the support structure 44 for the saw with the continuously running motor 45 and rotating saw blade 42 thereon to be pivoted toward the log. Additional valving operated by the saw support frame 44 and connected in the drive motor for the feed rollers will insure stopping of operation and rotation of the same as the saw is deflected downward toward the log and through the same to sever the log from the main portion of the tree length. The distance between the pressure or stop plate 84 and the saw structure 40 will define a predetermined log length which it is desired to cut and the controls thereon will automatically stop feeding movement and cause the saw frame 44 to be deflected in the sawing operation.

Positioned between the pressure plate 84 and the saw blade in the down position and beyond the end of the roller 35 marking the end of the conveyor bed is a trough-like ejector structure, indicated generally at 100. The structure is comprised of a pair of elongated plate members 101 and 102 pivotally connected along one edge and supported through a pair of actuators 104, 105 respectively which are adapted when energized to drop selectively the sides 101 or 102 as will be hereinafter defined. Suitable bracing supports 106 on the frame extension 80 pivotally amount the connected plates 101, 102 and limit movement of the same. With this ejector structure 100, one or the other of the sides will be selectively dropped so that a severed log section will be directed from the machine in one direction or the other. The side 102 through its actuator 105 will normally be dropped during an automatic sawing operation with pivotal movement of the pressure plate 84 against the control valve structure 90 so that a severed log will be dropped off this side of the trough indicating that a proper length log has been severed. With the dropping of the log, the pressure on the plate 84 will be released allowing the valving to switch again reversing movement of the saw frame and permitting starting of the feed rollers when the saw is in the fully retracted position. Severed logs which are dropped by displacement of the plate 102 will fall into a cradle-type bin formed by a pair of elongated cables 108, 109 which are connected at one extremity to a support structure 107 forming a part of the added frame structure 80 and positioned adjacent the edge of the plate 102 in the downward or deflected position. The other extremities of the cables 108, 109 are connected to an elongated bar member 110 carried by a pair of support members 112 and 114 which are pivotally connected on the cross frames 30 mounted on the chassis 26. With the support structures 112, 114 lowered, the elongated bar member extends generally horizontally with the extent of the frame 26 and the cables connected thereto and to the support structure 107 will define a bin type cradle which will receive severed logs of a desired or predetermined length. Thus the actuator 105 is connected for automatic operation by the pressure plate 84 so that the plate 102 will be lowered whenever a sawing operation occurs with the log being sawed holding the pressure plate 84 deflected. Automatic control through valve 90 similarly effects positioning of the saw support and a cessation of operation of the feed rollers 60, 61. Whenever it is desired to saw a log which is not long enough to deflect the pressure plate 84, the saw blade may be operated manually, as will be hereinafter noted, with the deflection of the saw support 44 stopping movement of the feed rollers. The plate 101 through its actuator 104 will be operated separately to deflect the plate 101 down allowing the shorter severed log to be discharged in the opposite direction. In this manner the shorter logs are not positioned in the cable type bin or cradle so that they are selectively disposed of and only predetermined length severed logs may be picked up and stacked from the cradle.

The vehicle frame with its extension structure 80 has positioned thereon substantially at the center of this overall extent a grapple type derrick or loader, indicated generally at 120. This loader is mounted on a pedestal type support 122 which in turn is secured to the chassis frame 26 of the vehicle through a plurality of transversely extending plate members or angle members 125 which are clamped to the frame through suitable nut and bolt type connections 130. At the top of the pedestal is positioned a platform 132 and the azimuth turntable 134 of the grapple loader which in turn mounts a pair of connected booms 135 and 136 to provide a generally articulated structure rotatable in azimuth and movable in elevation and in the plane toward and away from the pedestal. The outer boom member mounts a pair of clamping jaws 140 and the boom sections 135 and 136 are actuated through actuators 142 and 143 with the clamping jaws being actuated through actuators 145. An azimuth motor (not shown) controls movement of the entire structure in azimuth on the pedestal 122. The platform 132 mounts a control console 150 with a plurality of lever operated valve members, indicated generally at 160, thereon and a seat 170 beside the same in which an operator will position himself for operation of the mobile slasher. In addition a pair of foot pedals 174 are included for operation of separate valve components controlling portions of the slasher, as will be hereinafter identified. To prevent tilting of the chassis with movement of the boom under a load in the positioning of tree length logs on the conveyor bed or removal of logs from the cradle bin, a pair of foot members 180 with suitable actuators 182 connected thereto are pivotable from an elevated position to engage the ground and support chassis 26 against tipping. Such structure is employed when the vehicle or slasher is in usage and elevated when the vehicle is moved from site to site. Similarly the support members 114 and 112 are pivoted up on the cross brace members 30 to reduce the overall width of the structure during transportation. Although only a few of the control levers are shown in the drawings, it will be understood that suitable controls are positioned thereon for operating the articulated movements of the boom and the clamping jaws 140 thereon, for separate operation of the feed rollers 60, 61 and actuation of the actuator 104 of the trough structure together with the actuator 78 for the pressure roller and for movement of the saw structure toward and away from logs. In addition, a separate control is provided for an "on-off" operation or energization of the motor controlling the saw which will normally be continuously operating whenever the structure is in usage.

As shown in the schematic diagram of FIGURE 4, the hydraulic source 22 operated from the single engine of the vehicle will supply fluid under pressure in two directions, that is a feed and return line to a number of valve actuators and control actuators for the slasher. In FIGURE 4, 160a indicates four separate controls for articulating the grapple loader and operating the grapple thereon. Such valve structures will be bidirectional to provide such movement. Similarly a valve indicated schematically at 160b would be of the "on" and "off" type to provide hydraulic power to the saw structure or saw motor 45 to continuously operate the same. In addition this valve or similar valve control will energize the actuators 182 controlling the stabilizing support members whenever the structure is in usage. The automatic control valve structure 90, as at 90a, will provide bidirectional control to the pivot actuator 48 for the saw structure to raise and lower the same in a cutting operation. This valve will be so actuated that whenever the plate 84 is depressed it will allow fluid to flow to the actuator 48 to pivot the saw toward the conveyor bed. The control valve 90 includes control valving, shown at 90b, which controls the actuator 105 for the trough side 102. The trough side 101 is controlled by a separate control valve 160c supplying fluid to this actuator 104 for manual operation of this actuator. Automatic operation of the feed rollers is effected by a control valve section 90c which is operated whenever the pressure plate is in a forward position to energize the motors for feed rollers continuously. Such energization would be in a forward direction only. A separate control valve 160d provides bidirectional manual control of this actuator to cause selective movement of the feed rollers and reversal of direction of the same when desired. Suitable valving, indicated at 200, and actuated by the saw support structure 44 as it leaves a raised position would be interlocked with the feed circuit through the valve 90c to prevent energization of the feed rollers whenever the saw frame is starting to deflect. This actuator would prevent energization of the feed roller during entire movement of the saw frame until it is returned to an elevated position. The valve 160e would be of the "on" and "off" type to apply pressure to the actuator 78 of the pressure roller arm deflecting the same under manual operation. Feed roller rotation or the absence of the same will control a throttle valve 205 in the hydraulic control circuit to actuator 78 to increase the force on actuator 78 and hence arm 72 whenever the feed rollers are stopped. An additional control valve 203 operated by over deflection of the arm 72 indicates a short length log. This valve overrides the control to the trough section 101 which would normally be manually operated by the switch control 160c, so that upon the presence of a short length log beyond the feed roller the plate 101 will be deflected allowing such short length log to be ejected from the slasher in a direction remote from the cable type bin.

This improved mobile log slasher with its separate vehicle chassis and drive motor may be readily moved to various logging sites and transported therebetween on highways. The power plant or automotive engine for this vehicle will supply rotary power to a self-contained hydraulic system supplying power to the various actuators and components of the slasher. The vehicle on one edge thereof will provide its own input conveyor bed as defined by the trough type rollers 32–34 and the straight roller 35 so that tree length logs may be positioned thereon. If desired, a portable and pivotal type extension may be included on the front end of the truck with suitable roller means for adding to this bed length. The operator at the logging site will be located on the control platform in front of the grapple loader and with the control panel adjacent this position so that he may operate the control levers thereon to position the grapple to one side of the vehicle so that tree length logs may be picked up and placed on the troughing rollers with one end of the log being positioned between the feed rollers 60, 61 and the pressure roller 70. The controls would be energized so that hydraulic fluid under pressure would cause energization and rotation of the saw motor and hence the saw blade as well as energization and rotation of the feed roller motor such that they would be under conditions of automatic control. With the logs so positioned on the input conveyor bed, the operator would operate to close the valve 160c to the pressure roller actuator 78 and this pressure roller would now hold the log through hydraulic pressure against the revolving feed rollers with the prongs 75 thereon. Rotation of the feed rollers would initiate the automatic operation which would continue until the tree length log is sawed into desired measured lengths. Thus the tree length log would be traversed by the feed rollers urging the log toward the stop or pressure plate 84 until the pressure plate is tripped actuating its composite hydraulic valve control 90 which would stop the motors for the feed rollers 60, 61 and initiate the saw down cycle through energization of the actuator 48. The saw blade being continuously rotating and the feed rollers being stopped, a definite measured length of log would be positioned therebetween to be severed as the saw blade is deflected on the log. During this period of time the valving 90 would permit the guide trough side 102 to be folded down and provide a log exit to the cable type bins 108, 109. When the log is cut-off, it rolls into the cable bin or sling cradle area and the trip plate or pressure plate 84 will return to its original position under the influence of the spring 88 to reverse the position of the valving control 90. The movement of the stop plate will reverse the position of the valving for the saw support causing the same to raise and the feed rollers will remain at rest until the saw has returned to its raised position. During this period of time the side 101 of the trough will remain raised. With the saw elevated to its original position, the feed rollers are again rotated with the pressure roller remaining clamped against the log so that the tree length log will be moved forward again until its extremity engages the stop plate to initiate the cycle. This automatic cycle will be repeated until the log is completely sawed into measured lengths. The tag end of the tree length log or the portion of the log remaining after a number of measured cuts will be automatically discharged away from the cable cradle area or the cable bin. This is accomplished through energization of the actuator 104 either manually or automatically as a separate hydraulic valve will be actuated by the arm 72 as the pressure roller slides off the tag end of the tree length log as it passes the feed rollers. This trough side 101 will return to its original position when the operator manually opens the pressure roller assembly by reversing the valving 160c to move the pressure roller arm 72 to an open position permitting the entrance of a new tree length log to the feed mechanism. During the automatic sawing cycles, the operator is free to unload the sawed logs from the cradle arm and to direct the same onto hauling trucks or to stockpiles adjacent the slashing machine. In addition he may start loading new tree length logs onto the troughing loaders to initiate another swing cycle.

With this improved machine the operator has complete control to override any of the automatic actuators. The oil supply to the feed roller motors is interlocked with the valve 20 actuated by the saw support frame or carrier to prevent the feed rollers from revolving at any time that the saw carrier or support structure is not in its extreme raised or return position thereby preventing the feed rollers from moving while the saw is cutting the tree length log.

In the event that the saw cannot complete its sawing cycle due to conditions such as dullness of the blade or extremely hard wood, the operator can manually reverse the cycle of the saw support structure to raise the same allowing the saw motor to catch up to speed before manually returning the saw to the cutting condition. The foot pedals 174 are provided for manually initiating and terminating a sawing cycle by raising and lowering of the saw support structure or carrier through separate hydraulic controls apart from the operation of the pressure plate valving 90. In addition the operator can also initiate a sawing cycle under conditions where an extremely crooked log would miss the pressure plate or for some reason the operator may want to cut short from the measured length. Suitable valving is also provided in the control of the feed rollers such that their rotation may be reversed to eject a tree length log from the troughing rollers in the event that the wrong end of the log is placed thereon. The saw motor is operated from the hydraulic power supply and is a constant speed motor regardless of vehicle engine speed so that the saw will never overspeed in the event of varied operation of the vehicle motor. The pressure arm cylinder 78 provides a constant hydraulic pressure during the traverse feeding cycle. During the sawing cycle this hydraulic pressure is automatically increased to provide additional clamping action on the saw during this cycle. This improved hydraulic system is operated from the single engine of the vehicle which is also used for propelling the same.

In considering this invention it should be remembered that the present disclosure is intended to be illustrative only and the scope of the invention should be determined by the appended claims.

What is claimed is:

1. A mobile log slasher comprising, an elongated mobile frame, a plurality of spaced roller members aligned on one side of the elongated frame including several of which are positioned in a trough-like arrangement and defining a conveying bed for guiding tree length logs to be cut into predetermined tree length logs, said roller members defining the conveying bed being positioned over a partial extent of the elongated frame, a pair of fixed feed roller members having spaced vertical axes positioned on the frame on said one side thereof adjacent the conveying bed and adapted to engage logs thereon, a freely rotating press roller having a vertical axis disposed adjacent the feed rollers and mounted on an arm pivotally attached to the frame on the opposite side of the conveying bed from the feed rollers, and adapted to be pivoted toward and away from the feed rollers to engage logs on the conveying bed and urge them toward the feed rollers, means connected to the feed rollers for driving the same to move logs on the conveying bed, said feed rollers and said press roller being located on said one side of said frame between the last two of the spaced roller members and intermediate the extent thereof, a pivoted saw frame mounted on the elongated mobile frame adjacent the last of said spaced roller members and including means for pivoting the saw frame, circular saw means journaled on the pivoted saw frame and adapted to be moved toward and away from logs on the conveying bed, said saw means being positioned to engage the log beyond the last of said spaced rollers on the conveying bed, stop means positioned on the frame remote from the spaced roller members and removed from the saw means a predetermined distance, log ejecting means positioned between the stop means and the saw means and adapted to receive severed logs from the conveying means and translationally displace the same relative to the conveying bed, and a grapple loader with a control means thereon mounted on said mobile frame intermediate the extent thereof and elevated above the conveying bed to move the logs onto the conveying bed and severed logs ejected by the ejecting means, said stop means including control means inter-connected with the pivoting means for the pivoted saw frame and the driving means for the feed rollers to selectively control the same in the conveying and sawing operation, said pair of feed rollers and the driving means connected thereto including control means operated selectively by said control means of stop means when the stop means is engaged by a tree length log to stop rotation of the feed rollers and to displace the pivoted saw frame with the circular saw means thereon to sever a portion of the log between the saw means and the stop means, said log ejecting means being a V-shaped trough structure with a pair of pivoted side members defining the same and with actuators for pivoting the side members relative to one another for the purpose of allowing a severed log to be displaced therefrom, one of said actuators for said side members being operated through control means positioned at the grapple loader to permit selective operation so as to displace logs from the trough means in one direction transverse to the extent of the frame for the purpose of selectively sorting severed logs which vary from a predetermined length.

2. The mobile log slasher of claim 1 and including a bin means positioned adjacent the V-shaped log ejecting means and adapted to receive logs from the other side member of the same with the actuator means for said other side member of said trough means being selectively operated by the control means for stop means.

3. The mobile log slasher of claim 2 and including a control panel with the control means thereon and an operator seat positioned on the grapple loader and elevated on the mobile frame above the saw means and feed rollers to enable an operator to load the conveying bed and pick up severed logs from the bin as well as selectively operate the feed roller, the saw means and the ejector means.

4. The mobile log slasher of claim 3 in which the mobile frame is included in part on a truck.

5. The mobile log slasher of claim 4 in which the feed rollers are comprised of cylindrical members with a plurality of radially extending rod members thereon designed to engage the surface of the log and move the same on a conveying bed.

6. The mobile log slasher of claim 5 in which the press roller is a cylindrical member having radially extending fluted surfaces vertically positioned thereon adapted to engage a log surface and urge it into engagement with the feed rollers for the purpose of moving tree length logs on the conveying bed.

7. A mobile log slasher of claim 5 in which the press roller includes means for urging the logs against the fixed roller members and the feed rollers to securely hold the logs during sawing operation.

8. The mobile log slasher of claim 6 in which the fluted surfaces on the press roller are inclined to the vertical axes thereof to get an overall truncated conical configuration with the smaller diameter extremity being located closest to the frame of the log slasher.

9. A mobile log slasher comprising, an elongated mobile frame, a plurality of spaced roller members aligned on one side of the elongated frame and defining a conveying bed for tree length logs to be cut into predetermined tree length logs, said roller members defining the conveying bed being positioned over a partial extent of the elongated frame, a pair of fixed feed roller members positioned on the frame on said one side thereof adjacent the conveying bed and adapted to engage logs thereon, a freely rotating press roller disposed adjacent the feed rollers and mounted on an arm pivotally attached to the frame on the opposite side of the conveying bed from the feed rollers and adapted to be pivoted toward and away from the feed rollers to engage logs on the conveying bed and urge them toward the feed rollers, means connected to the feed rollers for driving the same to move logs on the conveying bed, a pivoted saw frame mounted on the elongated mobile frame adjacent the last of said spaced roller members and including means for pivoting the saw frame, saw means journaled on the movable saw frame and adapted to be moved toward and away from logs on the conveying bed, said saw means being positioned to engage the log beyond the last of said spaced rollers on the conveying bed, stop means positioned on the frame remote from the spaced roller members and removed from the saw means a predetermined distance, and log ejecting means positioned between the stop means and the saw means and adapted to receive severed logs from the conveying means and translationally displace the same relative to the conveying bed, said stop means including control means inter-connected with the movable means for the saw frame and the driving means for the feed rollers to selectively control the same in the conveying and sawing operation.

10. The mobile log slasher of claim 9 in which the ejecting means is a V-shaped trough structure adapted to catch the severed log after operation of the saw means, said trough structure having a movable side and an actuator for moving the same which allows the severed log to be displaced therefrom.

References Cited

UNITED STATES PATENTS

| 3,275,046 | 9/1966 | Moyers et al. | 143—46 |
| 2,039,017 | 4/1936 | McCleod | 143—46 |

FOREIGN PATENTS 621,584  6/1961  Canada.

FRANCIS S. HUSAR, Primary Examiner

U.S. Cl. X.R.

143—43, 157